US010423562B2

(12) United States Patent
Teruyama

(10) Patent No.: US 10,423,562 B2
(45) Date of Patent: Sep. 24, 2019

(54) INFORMATION PROCESSING APPARATUS, INFORMATION PROCESSING METHOD, AND PROGRAM

(71) Applicant: Sony Corporation, Tokyo (JP)

(72) Inventor: Katsuyuki Teruyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/795,614

(22) Filed: Oct. 27, 2017

(65) Prior Publication Data

US 2018/0052796 A1 Feb. 22, 2018

Related U.S. Application Data

(63) Continuation of application No. 14/406,412, filed as application No. PCT/JP2013/003524 on Jun. 15, 2013, now Pat. No. 9,830,296.

(30) Foreign Application Priority Data

Jun. 15, 2012 (JP) ................................. 2012-135708

(51) Int. Cl.
G06F 13/42 (2006.01)
G06F 13/40 (2006.01)
H04W 4/80 (2018.01)

(52) U.S. Cl.
CPC ...... *G06F 13/4221* (2013.01); *G06F 13/4027* (2013.01); *H04W 4/80* (2018.02)

(58) Field of Classification Search
None
See application file for complete search history.

(56) References Cited

U.S. PATENT DOCUMENTS 5,128,926 A * 7/1992 Perlman ................. H04L 29/00
370/248
2007/0263595 A1* 11/2007 Charrat ................... H04L 45/00
370/351

(Continued)

FOREIGN PATENT DOCUMENTS

EP 2251986 A1 11/2010
EP 2326061 A2 5/2011

(Continued)

OTHER PUBLICATIONS

"Smart Cards; UICC—Contactless Front-end(CLF) Interface; Host Controller Interface(HCI) (Release 11);ts 102622v110000p draftXP". ETSI Draft; TS 102622V110000P DRAFTXP. European Telecommunications Standards Institute (ETSI). 650. Route Des Lucioles; F-06921 Sophia-Antipolis ; France. vol. SCP. No. V11.O.O. Sep. 5, 2011 (Sep. 5, 2011). pp. 1-56. XP014101478. [retrieved on Sep. 5, 2011] sections: 4. 6.1.3.1. 8.1.1. 9.1.

(Continued)

*Primary Examiner* — Elias Mamo
(74) *Attorney, Agent, or Firm* — Lerner, David, Littenberg, Krumholz & Mentlik, LLP

(57) ABSTRACT

An information processing apparatus including processing units and a connection control unit that controls the connections between the processing units, in which the connection control unit is provided with a table creation unit which, with respect to a first logical channel established with a processing unit, creates table information showing a correspondence between logical channels without designating a logical channel that corresponds to the first logical channel when there is no second logical channel established with another processing unit that corresponds to the first logical channel, a table storage unit that stores the table information created by the table creation unit, and a table update unit that updates the table information for the second logical channel (Continued)

that is stored in the table storage unit so as to configure the first logical channel as a logical channel that corresponds to the second logical channel when there is a second logical channel.

15 Claims, 21 Drawing Sheets

(56) References Cited

U.S. PATENT DOCUMENTS

| | | | |
|---|---|---|---|
| 2010/0054135 A1 | 3/2010 | Rahman et al. | |
| 2010/0330904 A1 | 12/2010 | Stougaard | |
| 2011/0130095 A1* | 6/2011 | Naniyat | G06K 7/0008 455/41.1 |
| 2012/0052801 A1* | 3/2012 | Kulkarni | G06K 7/0008 455/41.1 |
| 2013/0100808 A1* | 4/2013 | Doron | H04L 47/125 370/235 |
| 2014/0273838 A1 | 9/2014 | Naniyat et al. | |
| 2014/0273839 A1 | 9/2014 | Naniyat et al. | |

FOREIGN PATENT DOCUMENTS

| | | |
|---|---|---|
| JP | 199931118 A | 2/1999 |
| JP | 2006058920 A | 3/2006 |
| JP | 2008022533 A | 1/2008 |
| JP | 2008530936 A | 8/2008 |
| JP | 2011-130414 A | 6/2011 |
| JP | 2011130414 A | 6/2011 |
| JP | 2011528886 A | 11/2011 |
| WO | 2010-011055 A2 | 1/2010 |
| WO | 2012065643 A1 | 5/2012 |

OTHER PUBLICATIONS

International Search Report from International Publication No. PCT/JP2013/003524 dated Nov. 28, 2013.
Japanese Office Action for JP 2012-135708 dated Jan. 14, 2016.
Japanese Office Action for Application No. JP2016-153549 dated May 30, 2017.
Japanese Office Action for Application No. JP2016153549 dated Dec. 19, 2017.

* cited by examiner

FIG. 2

| HEADER | | | | | MESSAGE |
|---|---|---|---|---|---|
| 000b [3] | PBF [1] | Connection ID [4] | RFU [8] | Payload Length [8] | Payload |

THE FIGURE INSIDE THE [ ] INDICATES THE NUMBER OF BITS

FIG. 3

| HEADER | | | | | | MESSAGE |
|---|---|---|---|---|---|---|
| TYPE [3] | PBF [1] | GID [4] | RFU [2] | OID [6] | Payload Length [8] | Payload |

THE FIGURE INSIDE THE [ ] INDICATES THE NUMBER OF BITS

FIG. 4

| FIELD | SETTING CONTENTS | | DESCRIPTION |
|---|---|---|---|
| GID | | | (0000b) |
| OID | CONN_CREATE_COM | | CONNECTION CREATION REQUEST (0100b) |
| Payload | Destination Type | | CONNECTION DESTINATION TYPE '03': NFCEE |
| | Number of Destination-specific Parameters | | |
| | Destination-specific Parameters | Type | '01': NFCEE |
| | | Length | '02' |
| | | Value | NFCEE ID<br>NFCEE Protocol |

FIG. 5

| FIELD | SETTING CONTENTS | DESCRIPTION |
|---|---|---|
| GID | | (0000b) |
| OID | CONN_CREATE_RES | CONNECTION CREATION RESPONSE (0100b) |
| Payload | Status | COMMAND PROCESS RESULT |
| | Max Data Packet Payload Size | MAXIMUM Data Packet Payload SIZE |
| | Initial Number of Credits | INITIAL NUMBER OF CREDITS |
| | Conn ID | CONNECTION ID |

FIG. 6

| FIELD | SETTING CONTENTS | DESCRIPTION |
|---|---|---|
| GID | | (0000b) |
| OID | CONN_CLOSE_COM | CONNECTION CLOSE REQUEST (0101b) |
| Payload | Conn ID | CONNECTION ID |

FIG. 7

| FIELD | SETTING CONTENTS | DESCRIPTION |
|---|---|---|
| GID | | (0000b) |
| OID | CONN_CLOSE_RES | CONNECTION CLOSING RESPONSE (0101b) |
| Payload | Status | COMMAND PROCESS RESULT |

FIG. 8

| FIELD | SETTING CONTENTS | DESCRIPTION |
|---|---|---|
| GID | | (0010b) |
| OID | NFCEE_DISCOVER_NTF | NFCEE CONNECTION STATUS NOTIFICATION (0000b) |
| Payload | NFCEE ID | VALUE IN A RANGE OF 1 TO 254 IS ALLOCATED BY CLF WHEN CLF DETECTS CONNECTION OF NFCEE |
| | NFCEE Status | NFCEE IS CONNECTED AND CAN BE USED ('00') |
| | | NFCEE IS CONNECTED AND CANNOT BE USED ('01') |
| | | NFCEE HAS BEEN REMOVED ('02') |
| | Number of Protocol Information | NUMBER OF NFCEE PROTOCOLS |
| | Protocol Information | NFCEE PROTOCOL LIST |
| | Number of NFCEE Information | NUMBER OF NFCEE INFORMATION |
| | NFCEE Information | NFCEE INFORMATION (HARDWARE IDENTIFICATION INFORMATION) |

FIG. 9

| HEADER | | MESSAGE | | |
|---|---|---|---|---|
| CB [1] | pID [7] | TYPE [2] | INSTRUCTION [6] | Data |

THE FIGURE INSIDE THE [ ] INDICATES THE NUMBER OF BITS

FIG. 10

| FIELD | SETTING CONTENTS | DESCRIPTION |
|---|---|---|
| INSTRUCTION | ADM_CREATE_PIPE | PIPE CREATION REQUEST ('10') |
| Data | Source Gate ID | CONNECTION SOURCE GATE ID |
| | Destination Host ID | CONNECTION DESTINATION HOST ID ('01') |
| | Destination Gate ID | CONNECTION DESTINATION GATE ID |

FIG. 11

| FIELD | SETTING CONTENTS | DESCRIPTION |
|---|---|---|
| INSTRUCTION | ANY_OK | PROCESS NORMAL CLOSURE |
| Data | Source Host ID | CONNECTION SOURCE HOST ID |
| | Source Gate ID | CONNECTION SOURCE GATE ID |
| | Destination Host ID | CONNECTION DESTINATION HOST ID |
| | Destination Gate ID | CONNECTION DESTINATION GATE ID |
| | Pipe ID | PIPE ID |

FIG. 12

| FIELD | SETTING CONTENTS | DESCRIPTION |
|---|---|---|
| INSTRUCTION | ANY_OPEN_PIPE | PIPE OPENING REQUEST |
| Data | (Empty) | |

FIG. 13

| FIELD | SETTING CONTENTS | DESCRIPTION |
|---|---|---|
| INSTRUCTION | ANY_OK | PROCESS NORMAL CLOSURE |
| Data | Number of pipes open | NUMBER OF PIPES TO BE CONNECTED TO GATE |

FIG. 15

| MANAGEMENT INFORMATION | HCI | E-HCI |
|---|---|---|
| COMMUNICATION PATH IDENTIFICATION INFORMATION | Connection ID | Pipe ID |
| COMMUNICATION PROTOCOL IDENTIFICATION INFORMATION | NFCEE Protocol | Gate ID |

FIG. 16

| Conn ID | Pipe ID |
|---|---|
| T4T Conn ID | T4TA wired pipe ID AND/OR T4TB wired pipe ID |
| T3T Conn ID | T3T wired pipe ID |

FIG. 17

| NFCEE Protocol | Gate ID |
|---|---|
| APDU (T4T) | T4T wired gate ID |
| T3T | T3T wired gate ID |

FIG. 25

| INDEX | PIPE ID (1 BYTE) | CONNECTION ID (1 BYTE) |
|---|---|---|
| 1 | 'FF' | 'FF' |
| 2 | 'FF' | 'FF' |
| ⋮ | | |
| 16 | 'FF' | 'FF' |

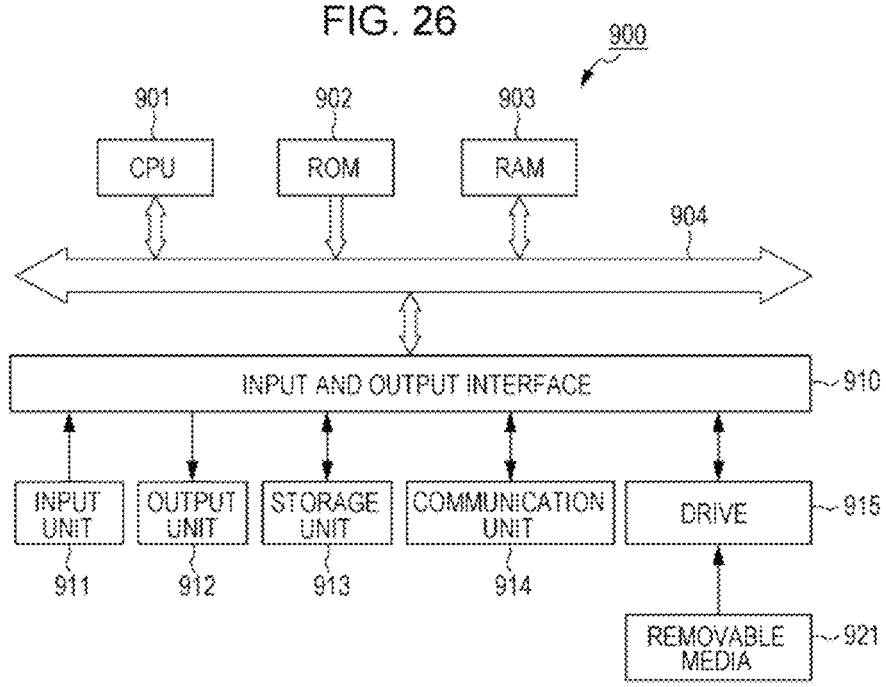

INFORMATION PROCESSING APPARATUS, INFORMATION PROCESSING METHOD, AND PROGRAM

CROSS-REFERENCE TO RELATED APPLICATIONS

The present application is a continuation of U.S. patent application Ser. No. 14/406,412, filed on Dec. 8, 2014, which application is a national phase entry under 35 U.S.C. § 371 of International Application No. PCT/JP2013/003524 filed Jun. 5, 2013, which claims priority from JP2012/135708 filed Jun. 15, 2012.

TECHNICAL FIELD

The present disclosure relates to an information processing apparatus, an information processing method and a program, and more specifically, relates to an information processing apparatus, an information processing method and a program that are configured to be capable of more easily establishing communication through interfaces with different communication standards.

BACKGROUND ART

The HCI ((Host Controller Interface) specification is defined in the ETSI (European Telecommunications Standards Institute) SCP (Smart Card Platform) as an interface that connects with CLFs (Contactless Front-end) in NFC (Near Field Communication) devices.

The HCI (Host Controller Interface) specification defines the logical interface between a UICC (Universal IC Card) and a CLF (refer to PTL 1).

CITATION LIST

Patent Literature

[PTL 1]
Japanese Unexamined Patent Application Publication No. 2011-130414

SUMMARY

Technical Problem

However, a logical interface between a DH and a CLF is not defined. Therefore, it is possible to consider implementation with a unique specification that is different from the HCI. In such a case, since the information that is managed in these interfaces differs respectively, there was concern that performing communication between a DH and a UICC through a CLF using two types of interface would be difficult.

It is desirable to more easily establish communication through interfaces with different communication standards.

Solution to Problem

An information processing apparatus according to an embodiment of the present disclosure is provided with a plurality of processing units and a connection control unit that controls the connections between the plurality of processing units, in which the connection control unit is provided with a table creation unit which, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, a table storage unit that stores the table information created by the table creation unit, and a table update unit that updates the table information for the second logical channel that is stored in the table storage unit so as to configure the first logical channel as a logical channel that corresponds to the second logical channel in a case in which there is a second logical channel.

In an information processing apparatus according to the embodiment of the present disclosure, the connection control unit may further include a logical channel establishment unit that establishes the logical channels between the processing units, the table creation unit may create the table information for the first logical channel without designating a logical channel that corresponds to the first logical channel when there is no second logical channel in a case in which the first logical channel has been established by the logical channel establishment unit, and the table update unit may update the table information for the second logical channel that is stored in the table storage unit so as to configure the first logical channel as a logical channel that corresponds to the second logical channel when there is a second logical channel in a case in which the first logical channel has been established by the logical channel establishment unit.

In an information processing apparatus according to the embodiment of the present disclosure, the table creation unit and the table update unit may respectively determine whether or not there is a second logical channel that corresponds to the first logical channel on the basis of a correspondence table of the characteristics of each logical channel.

In an information processing apparatus according to the embodiment of the present disclosure, the plurality of processing units may include a first processing unit in which the logical channel establishment unit establishes logical channels for each function and a second processing unit in which the logical channel establishment unit establishes logical channels for each protocol, the correspondence table may include information that shows a correspondence relationship of the functions and the protocols as the characteristics, the table creation unit may create table information for the first logical channel without designating a logical channel that corresponds to the first logical channel when, on the basis of the correspondence table, there is no second logical channel for the protocol that corresponds to the function of the first logical channel, which is established with the second processing unit, in a case in which a first logical channel has been established with the first processing unit by the logical channel establishment unit, and the table update unit may update the table information for the second logical channel that is stored in the table storage unit so as to configure the first logical channel as a logical channel that corresponds to the second logical channel when, on the basis of the correspondence table, there is a second logical channel for the protocol that corresponds to the function of the first logical channel, which is established with the second processing unit, in a case in which a first logical channel has been established with the first processing unit by the logical channel establishment unit.

In an information processing apparatus according to the embodiment of the present disclosure, the logical channel establishment unit may establish logical channels with communication standards that differ from one another with each processing unit.

In an information processing apparatus according to the embodiment of the present disclosure, the logical channel establishment unit may establish logical channels with a requested processing unit on the basis of requests from each processing unit.

In an information processing apparatus according to the embodiment of the present disclosure, the logical channel establishment unit may allocate identification information to the established logical channels.

In an information processing apparatus according to the embodiment of the present disclosure, the connection control unit may further include a status storage unit that stores information that shows the current status of logical channels established by the logical channel establishment unit.

In an information processing apparatus according to the embodiment of the present disclosure, the table information may be information that shows a correspondence relationship between the logical channels using logical channel identification information.

In an information processing apparatus according to the embodiment of the present disclosure, the table update unit may delete the information of a disconnected logical channel from the table information stored in the table storage unit in a case in which a logical channel is disconnected.

In an information processing apparatus according to the embodiment of the present disclosure, the table storage unit may secure a storage region that stores the table information in advance.

In an information processing apparatus according to the embodiment of the present disclosure, the plurality of processing units may include a control unit that controls each unit of the information processing apparatus, and a device that is detachable from the information processing apparatus.

In an information processing apparatus according to the embodiment of the present disclosure, the connection control unit may further include a wireless communication unit that performs wireless communication with other apparatuses.

In an information processing method for an information processing apparatus according to another embodiment of the present disclosure, the information processing apparatus, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, stores the created table information, and updates the stored table information for the second logical channel so as to configure the first logical channel as a logical channel that corresponds to the second logical channel in a case in which there is a second logical channel.

A program according to still another embodiment of the present disclosure, causes a computer to function as a table creation unit which, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, a table storage unit that stores the table information created by the table creation unit, and a table update unit that updates the table information for the second logical channel that is stored in the table storage unit so as to configure the first logical channel as a logical channel that corresponds to the second logical channel in a case in which there is a second logical channel.

In an information processing apparatus according to an embodiment of the present disclosure, with respect to a first logical channel established with one processing unit, table information which shows a correspondence relationship between logical channels is created without designating a logical channel that corresponds to the first logical channel in a case in which there is no second logical channel established with another processing unit that corresponds to the first logical channel, the created table information is stored, and table information for the second logical channel that is stored is updated so as to configure the first logical channel as a logical channel that corresponds to the second logical channel in a case in which there is a second logical channel.

Advantageous Effects of Invention

According to the present disclosure, it is possible to process information. More specifically, it is possible to more easily establish communication through interfaces with different communication standards.

BRIEF DESCRIPTION OF DRAWINGS

FIG. 2 is a diagram that shows an example of the major components of an HCI data packet.

FIG. 3 is a diagram that shows an example of the major components of an HCI command/response packet.

FIG. 4 is a diagram that shows an example of an HCI connection creation command.

FIG. 5 is a diagram that shows an example of an HCI connection creation response.

FIG. 6 is a diagram that shows an example of an HCI connection termination command.

FIG. 7 is a diagram that shows an example of an HCI connection termination response.

FIG. 8 is a diagram that shows an example of an NFCEE normal connection status notification.

FIG. 9 is a block diagram that shows an example of the major components of an HCP packet.

FIG. 10 is a diagram that shows an example of an E-HCI pipe creation command.

FIG. 11 is a diagram that shows an example of an E-HCI pipe creation response.

FIG. 12 is a diagram that shows an example of an E-HCI pipe opening command.

FIG. 13 is a diagram that shows an example of an E-HCI pipe opening response.

FIG. 15 is a diagram that shows an example of management information.

FIG. 16 is a diagram that shows an example of a correspondence table of command ID and pipe ID.

FIG. 17 is a diagram that shows an example of a correspondence table of the NFCEE protocol and gate ID.

FIG. 25 is a diagram that shows an example of the implementation of a correspondence table.

FIG. 26 is a block diagram that shows the major components of a computer.

DESCRIPTION OF EMBODIMENTS

Figure 1:
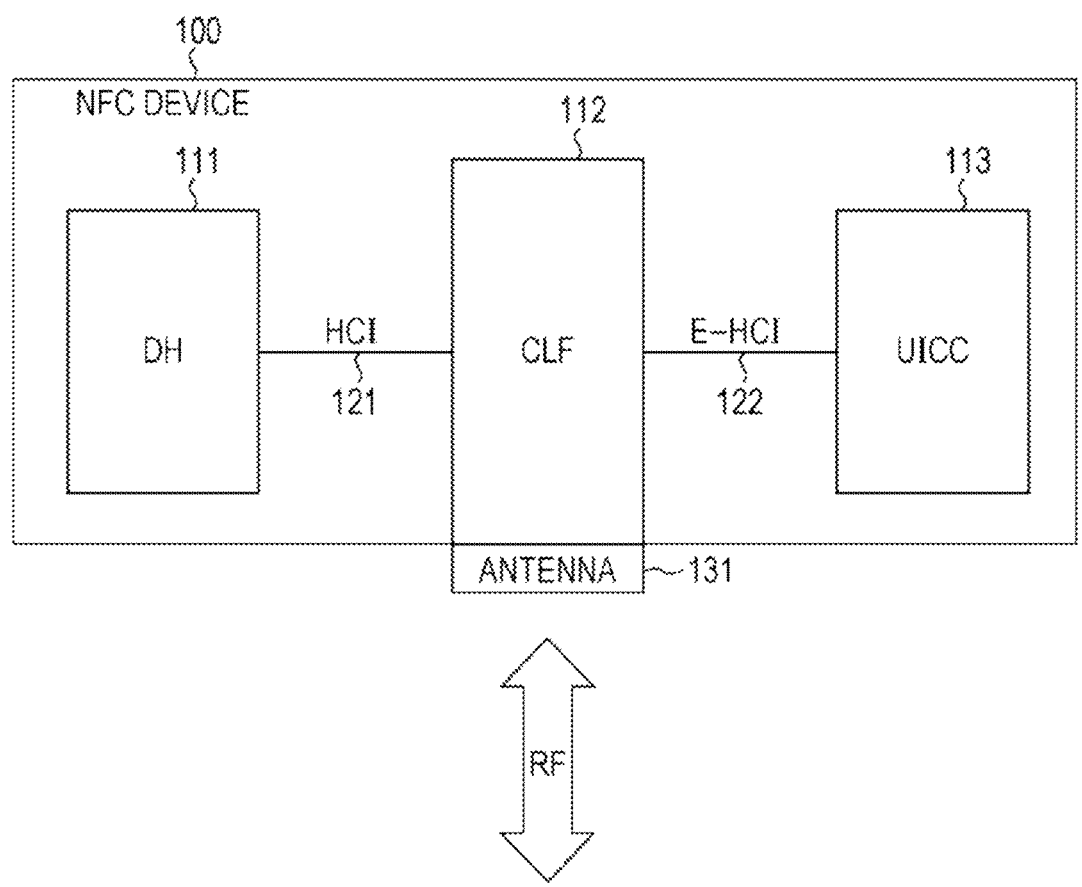
FIG. 1 is a diagram that shows an example of the major components of an NFC device.

Hereinafter, embodiments of the present disclosure (referred to as embodiments below) will be described. Additionally, the description will be made in the following order.
1. First Embodiment (NFC Device)
2. Second Embodiment (Computer)

First Embodiment 1-1 Communication in NFC Device

In an NFC (Near Field Communication) device, a DH (Device Host) and a UICC (Universal IC Card) are connected to a CLF (Contactless Front End). A logical interface (also referred to as a logic interface) between a CLF (Contactless Front End) and a UICC (Universal Integrated Circuit Card) is defined in the ETSI (European Telecommunications Standards Institute) SCP (Smart Card Platform) (HCI (Host Controller Interface)), but a logic interface between a DH and a CLF is not defined.

Accordingly, it is possible to apply interfaces that differ from the logic interfaces between a UICC and a CLF between a DH and a CLF. In such a case, communication between a DH and a UICC is performed through 2 different logic interfaces.

In such a case, since the information that is managed in these logic interfaces differs respectively, there was concern that performing communication between a DH and a UICC through a CLF would be difficult.

For example, in order to establish a connection between a DH and a UICC, it is necessary for a CLF to associate with a logic interface between the DH and the CLF and a logic interface between a UICC and a CLF as appropriate. In other words, it is necessary for a CLF to establish a logic interface with one side, receive connection requests from that side and establish a logic interface with another side and thus, be associated with two logic interfaces.

In order to establish a logic interface, it is necessary to make connection requests and queries with respect to a counterparty, stand by until a response is obtained, and the like, and as a result, there was concern that the processing time for a connection using this kind of sequence would increase.

In addition, for example, in a case in which a UICC is detachable from an NFC device, even in a case in which there is no UICC, a CLF makes a query and stands by for a response which might not be received when a connection is requested from the DH. There was concern that the connection processing time would be unnecessarily increased as a result of this kind of unnecessary process.

1-2 Control Process Using CLF

Therefore, the present embodiment is configured so as to be provided with a plurality of processing units and a connection control unit that controls the connections between the plurality of processing units, in which the connection control unit is provided with a table creation unit which, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, a table storage unit that stores the table information created by the table creation unit, and a table update unit that updates the table information for the second logical channel that is stored in the table storage unit so as to configure the first logical channel as a logical channel that corresponds to the second logical channel in a case in which there is a second logical channel.

The information processing apparatus may be an apparatus that performs any manner of process provided it is an information processing apparatus that has the above-mentioned configuration, and performs communication using each processing unit. In addition, each processing unit may perform any manner of process. The logical channels may be those of an arbitrary communication standard.

The connection control unit associates logical channels established with each processing unit as appropriate using table information. As a result of this, communication between processing units is possible. However, if this kind of process is performed at the start of communication between processing units, there is concern that the processing time would be increased as above. Therefore, before receiving a request for communication between processing units, the connection control unit creates table information with respect to logical channels established with a given processing unit. At this time, even in a case in which there is no counterparty that forms a correspondence relationship, table information is created without specifying the counterparty (the counterparty is left "blank"). In a case in which there is a corresponding counterparty, the table information of that counterparty is updated.

By adopting such a configuration, the connection control unit can omit processes such as unnecessary queries and can suppress an increase in the processing time of the connection process. Therefore, the information processing apparatus can more easily establish communication through interfaces with different communication standards.

For example, it becomes possible for the DH and the UICC to communicate via the CLF using the two interfaces (HCI and E-HCI) for connection to the CLF. More specifically, an application that is in the terminal host (DH) inside a mobile telephone can access the data of an application in the UICC. For example, it becomes possible for an electronic money application to view a balance of electronic money in the UICC, perform settlements and the like.

Additionally, the connection control unit may further include a logical channel establishment unit that establishes the logical channels between the processing units, the table creation unit may create the table information for the first logical channel without designating a logical channel that corresponds to the first logical channel when there is no second logical channel in a case in which the first logical channel has been established by the logical channel establishment unit, and the table update unit may update the table information for the second logical channel that is stored in the table storage unit so as to configure the first logical channel as a logical channel that corresponds to the second logical channel when there is a second logical channel in a case in which the first logical channel has been established by the logical channel establishment unit.

By adopting such a configuration, in addition to establishing a logical channel, the connection control unit can create table information for the logical channel and can cause the information of the logical channel to reflect the table information of other logical channels. As a result of this, it is possible to more easily establish communication between the processing unit and another processing unit from a point immediately after the logical channel has been established.

The table creation unit and the table update unit may respectively determine whether or not there is a second logical channel that corresponds to the first logical channel on the basis of a correspondence table of the characteristics of each logical channel.

The way in which the logical channels are formed is determined by standards. Therefore, in order to establish communication between processing units, it is necessary to select a suitable logical channel and associate the logical channel depending on the purpose and specification of the communication. Therefore, as a result of using a correspondence table of such logical channels and the characteristics thereof, it is possible to more easily perform association between logical channels.

The plurality of processing units may include a first processing unit in which the logical channel establishment unit establishes logical channels for each function and a second processing unit in which the logical channel establishment unit establishes logical channels for each protocol. In addition, the correspondence table may include information that shows a correspondence relationship of the functions and the protocols as the characteristics. Furthermore, the table creation unit may create the table information for the first logical channel without designating a logical channel that corresponds to the first logical channel when, on the basis of the correspondence table, there is no second logical channel for the protocol that corresponds to the function of the first logical channel, which is established with the second processing unit, in a case in which a first logical channel has been established with the first processing unit by the logical channel establishment unit. In addition, the table update unit may update the table information for the second logical channel that is stored in the table storage unit so as to configure the first logical channel as a logical channel that corresponds to the second logical channel when, on the basis of the correspondence table, there is a second logical channel for the protocol that corresponds to the function of the first logical channel, which is established with the second processing unit, in a case in which a first logical channel has been established with the first processing unit by the logical channel establishment unit.

In this manner, the connection control unit can associate logical channels depending on the protocols used in communication and the functions of applications or the like. Even in such a case, the connection control unit can more easily establish communication between processing units by creating table information.

The logical channel establishment unit may establish logical channels with communication standards that differ from one another with each processing unit.

As described above, the communication standard of the logical channels is arbitrary and the logical channel establishment unit can establish logical channels with communication standards that differ from one another. Even in such a case, the connection control unit can more easily establish communication between processing units by creating table information.

The logical channel establishment unit may establish logical channels with a requested processing unit on the basis of requests from each processing unit.

By adopting such a configuration, it is possible to establish logical channels on the basis of requests from the processing unit side. As a result of this, it is not necessary for the connection control unit to monitor the states of other processing units, and in addition, is capable of flexible correspondence such as, for example, the connection control unit can establish logical channels for a portion of functions of a processing unit only.

The logical channel establishment unit may allocate identification information to established logical channels.

Performing logical channel management is made easier as a result of using predetermined identification information such as an identification number. However, since the logical channels, which are the targets of management, may change as appropriate depending on the state of connection of the processing unit or the like, it is preferable to adopt a configuration in which identification information is allocated as appropriate. By adopting such a configuration, it is possible to suppress an unnecessary increase in the number of items of identification information that are handled and it is possible to suppress an increase in the amount of identification information.

The connection control unit may further include a status storage unit that stores information that shows the current status of logical channels established by the logical channel establishment unit.

If a logical channel that has already been established is terminated, the table information related to that logical channel is deleted. Therefore, in a case in which communication using the logical channel is requested, it is necessary to reestablish the logical channel. At this time, if there is no information, the connection control unit has to begin the process thereof by confirming whether or not there is such a logical channel (whether or not it is possible to establish a logical channel). Therefore, by retaining the information of logical channels that have already been established separately, using that information, it is possible for the connection control unit to return the status of the logical channel to the original state when the logical channel is reestablished. As a result of this, it is possible for the connection control unit to omit processes such as creation and opening of the logical channel and it is possible to more easily return the status of the logical channel to the original state.

The table information may be information that shows a correspondence relationship between the logical channels using logical channel identification information.

As a result of using identification information, it is possible to suppress an increase in the amount of table information. As a result of this, it is possible to reduce the storage capacity necessary in order to store the table information and it is possible to reduce the costs and load.

The table update unit may delete the information of a disconnected logical channel from the table information stored in the table storage unit in a case in which a logical channel is disconnected.

By reflecting not only the establishment of logical channels, but also the disconnection of logical channels in the table information, it is possible to understand the current establishment state of the logical channels from the table information and it is possible to more easily establish communication. In other words, processes such as confirmation of the current status of logical channels that can be associated according to the table information are unnecessary.

The table storage unit may secure a storage region that stores the table information in advance.

The table information changes depending on the establishment state of the logical channels, but by securing a storage region thereof in advance, it is possible to suppress the occurrence of defects such as insufficient capacity.

The plurality of processing units may include a control unit that controls each unit of the information processing apparatus and a device that is detachable from the information processing apparatus.

It is possible to apply the present disclosure to a CLF that establishes logical channels with a DH and a UICC in an NFC device.

The connection control unit may further include a wireless communication unit that performs wireless communication with other apparatuses.

The CLF can also perform communication with other devices using non-contact communication (near field communication).

Additionally, the present disclosure may be realized as not only an information processing apparatus, but also as an information processing method or a program.

1-3 Overview

CLF processing methods in the following cases will be described.

1) Correspondence management and association processes of management information of a unique interface HCI and management information of an E-HCI A) A connection between a DH and a UICC is established by connection requests from both the DH and the UICC connected to the CLF.

B) A "blank" correspondence table is created when a connection of either the HCI or the E-HCI is established, and the speed of the process is increased since a query made from the CLF to the connection destination is not necessary when a connection request from the other of the HCI or the E-HCI is received.

C) A notification is sent from the CLF to the DH when a detachable UICC is disengaged, and it is possible to avoid wasteful processes such as transmitting data to a UICC that is not connected.

2) Connection process sequence from the DH to the UICC
A) A communication channel is established depending on whether or not a pipe that forms a connection with a gate that has a function that corresponds to a designated data exchange format (protocol) has been formed when communicating with a detachable NFCEE such as a UICC via a CLF.

3) Connection process sequence from the UICC to the DH
A) A communication channel is established depending on whether or not a connection that has a data exchange format (protocol) that corresponds to a designated function (gate) has been formed when communicating with a DH via a CLF.

Differences between Connection from DH and Connection from UICC

In the case of a UICC, a list of gate IDs that show what function the UICC has is acquired, and a communication channel is set up for all possible gates in order to create or open a pipe with respect to the gates listed in the list. In contrast to this, in the case of a DH, a particular gate is selected and a communication channel is set up.

1-4 NFC Device

FIG. 1 is a diagram that shows an example of the major components of an NFC device. An NFC (Near Field Communication) device 100 is for example, an arbitrary communication apparatus such a mobile telephone. As shown in FIG. 1, the NFC device 100 includes a DH 111, a CLF 112 and a UICC 113.

The DH (Device Host) 111 is an entity (information processing apparatus) that controls the NFC device. The DH may also be an Embedded SE that operates as an information processing apparatus.

The CLF (Contactless Front End) 112 is an entity (communication processing apparatus) that has a function of being capable of communicating with external devices through RF (for example, non-contact communication, near field communication or the like). The CLF 112 includes an antenna 131 for such RF communication.

The UICC (Universal IC Card) 113 is a device that is detachable from the NFC device 100 (for example, a card-type device that can be inserted into a mobile telephone).

The DH 111 and the CLF 112 are connected by a HCI (Host Controller Interface) 121 which is a unique logical interface specification. In addition, the UICC 113 and the CLF 112 are connected by an E-HCI 122 defined in ETSI SCP.

1-5 HCI

The HCI 121 is a logical interface specification between the CLF 112 and the DH 111. In the HCI 121, viewed from the DH 111, an NFC processing entity is referred to as an NFCEE (NFC Execution Environment). In the NFCEE, there are entities that can process a plurality of protocols. In a case in which the DH 111 is connects to the NFCEE which is connected through the CLF 112, a DH 111 and NFCEE protocol processing entity is connected using the connection. Identifiers called Connection IDs are allocated to respective connections and the CLF 112 manages the identifiers.

The DH 111 can acquire the NFCEE identifiers (NFCEE IDs) that the CLF 112 manages and the protocols (NFCEE Protocols) that the NFCEE supports from the CLF 112 by transmitting a command to detect the NFCEE.

The UICC 113 is one form of the NFCEE. If the UICC 113 is connected to the CLF 112, the CLF 112 notifies the DH 111 of the NFCEE IDs and the NFCEE protocols. In a case in which the DH 111 is connected to the UICC 113, the above-mentioned NFCEE IDs and NFCEE protocols are designated. In the NFCEE protocol, there is, for example, an APDU (Application Protocol Data Unit), a T3T (Type 3 Tag) Command and the like. The APDU has a message structure defined by ISO (International Organization for Standardization)/IEC (International Electrotechnical Commission) 7816-4. The foregoing is used in an NFC Forum Type 4 Tag Operation. The T3T has a message structure defined by NFC Forum Type 3 Tag Operation.

1-6 E-HCI

The E-HCI 122 is a logical interface specification between the CLF 112 and the UICC 113 that is defined by ETSI SCP. Here, it is referred to as an E-HCI. In the E-HCI 122, NFC processing entities that include the DH 111 and the UICC 113 are referred to as hosts. Hosts have 1 or more gates that represent an independent function, and configure a pipe by connecting to a gate in the CLF 112.

The CLF 112 and the host have to implement a gate, an Administration gate, that manages the pipe. The host has a host ID that is unique within the device. Fixed values are allocated to the DH 111 and UICC 113. Therefore, in a case in which it is desirable to connect the UICC 113 to the DH 111, the host ID is designated.

1-7 Message Structure

Next, the HCI message specification will be described.

FIG. 2 is a diagram that shows an example of the major components of an HCI data packet. These packets are used in the transfer of messages that are exchanged on a logical channel that is designated by the Connection ID.

In FIG. 2, the PBF (Packet Boundary Flag) is information that shows whether or not the next packet is consecutive. In addition, the Connection ID is identification information that identifies the logical channel. The RFU (Reserved for future use) is a region for expansion. The Payload Length is information that shows the length of a Payload. The Payload stores higher-layer messages. The message format differs according to the NFCEE protocol used.

FIG. 3 is a diagram that shows an example of the major components of an HCI command/response packet. These packets are used to transfer HCI commands and HCI responses.

In FIG. 3, the TYPE is information that shows the contents of the packet. The TYPE is set as "001b", a value that represents a "request", "010b", a value that represents a "response", or "011b" that represents a "notification". The PBF (Packet Boundary Flag) is information that shows whether or not the next packet is consecutive. The GID (Group ID) is information that shows which function class the packet has. The OID (Opcode ID) is information that shows the function of the packet. The RFU (Reserved for future use) is a region for expansion, and the Payload Length shows the length of a Payload. The Payload stores the parameters of the command or the response.

Hereinafter, an example of the information that is transferred by the packet will be shown.

FIG. 4 is a diagram that shows an example of an HCI connection creation command. In FIG. 4, the NFCEE ID is set as an ID that the DH 111 was notified of beforehand by the CLF 112. In the NFCEE protocol, an APDU ("00") and a T3T Command ("02") are set according to the format of the message that the application exchanges.

FIG. 5 is a diagram that shows an example of an HCI connection creation response. FIG. 6 is a diagram that shows an example of an HCI connection termination command. FIG. 7 is a diagram that shows an example of an HCI connection termination response.

FIG. 8 is a diagram that shows an example of an NFCEE normal connection status notification.

Next, the E-HCI message specification will be described.

FIG. 9 is a block diagram that shows an example of the major components of an HCP packet of the E-HCI 122. The packet is used in the transfer of a message that is exchanged on a logical channel that is designated by the Pipe ID. A command and a response are included in the messages that are exchanged.

In FIG. 9, the CB (Chaining Bit) is information that shows whether or not the next packet is consecutive. The pID (Pipe ID) is identification information that identifies that pipe in which the packet is transferred. The TYPE is information which shows the type (command, response or event) of the packet. The INSTRUCTION is information that shows the function of the packet. The Data stores higher-layer messages. The format of the messages differs according to the CLF gate ID.

Hereinafter, an example of the information that is transferred by the packet will be shown.

FIG. 10 is a diagram that shows an example of an E-HCI pipe creation command. In order to designate the gate ID of the connection destination, the UICC 113 acquires a list of gate IDs from an Identity management gate on the CLF 112 beforehand. Since a gate ID for connection to the DH 111 is yet to be determined in ETSI, it is necessary to define a unique gate ID. For example, the gate ID is defined in the following manner.

T4AT wired gate ID="F0"
T4BT wired gate ID="F1"
T3T wired gate ID="F2"

FIG. 11 is a diagram that shows an example of an E-HCI pipe creation response. FIG. 12 is a diagram that shows an example of an E-HCI pipe opening command. FIG. 13 is a diagram that shows an example of an E-HCI pipe opening response.

1-8 Logical Channel Establishment Process

A logical communication path for communication between the DH 111 and the UICC 113 is referred to as a logical channel (or a logical channel). A unique command is used between the DH 111 and the CLF 112 and a command defined by the E-HCI is used between the UICC 113 and the CLF 112.

Figure 14:
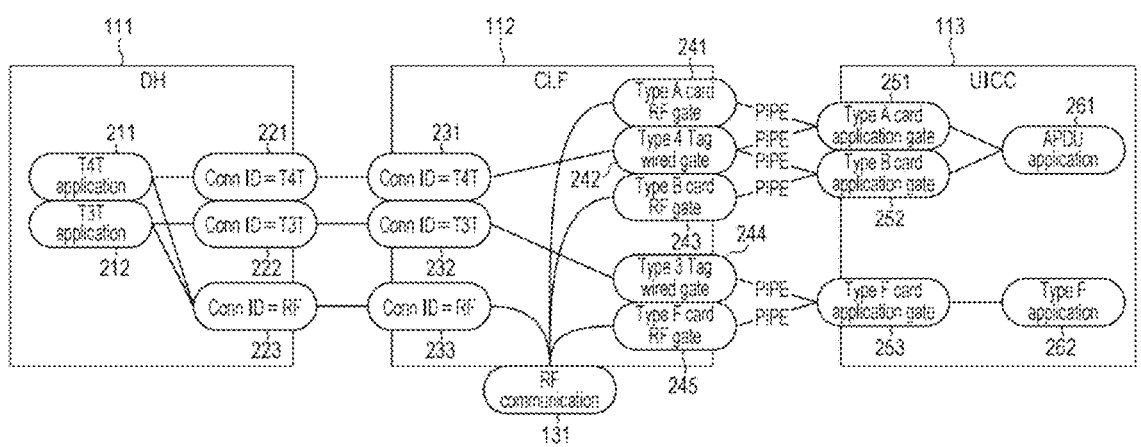
FIG. 14 is a diagram that shows an example of a communication path in an NFC device.

FIG. 14 is a diagram that shows an example of a system configuration in an NFC device.

The DH 111 can implement arbitrary applications, but in FIG. 14, as an example, a T4T application 211 that is a T4T (APDU) command base application and a T3T application 212 that is a T3T command base application are implemented.

In addition, it is possible to implement arbitrary connections between the DH 111 and the CLF 112, but in FIG. 14, as an example, a T4T connection (T4T conn) 221 and T3T connection (T3T conn) 222 that are connections for communication between the DH and the UICC, and an RF connection (RF conn) 223 that is a connection for RF communication are implemented.

Furthermore, the CLF 112 can implement arbitrary gates, but in FIG. 14, as an example, a type A RF card gate 241 and a type B RF card gate 243 are implemented. The CLF 112 also implements a type F RF card gate 245 that has been defined by the E-HCI. In addition, the CLF 112 implements a T4T wired gate (Type 4 Tag (T4T) wired gate (unique)) 242 and a T3T wired gate (Type 3 Tag (T3T) wired gate (unique)) 244 as gates for communication between the DH 111 and the UICC 113.

In addition, the UICC 113 can implement arbitrary gates, but in FIG. 14, as an example, for example, a type A card application gate 251 that controls the type A RF card gate 241 is implemented. In addition, the UICC 113 implements, for example, a type B card application gate 252 that controls the type B RF card gate 243. Furthermore, the UICC 113 implements, for example, a type F card application gate 253 that controls the type F RF card gate 245.

Additionally, in FIG. 14, a type A RF pipe, a type B RF pipe, type F RF pipe, a T4TA pipe, a T4 TB pipe and a T3T pipe have been created between the CLF 112 and the UICC 113.

The Type A RF pipe is a pipe between the Type A RF card gate 241 and the Type A card application gate 251. The Type B RF pipe is a pipe between the Type B RF card gate 243 and the Type B card application gate 252. The Type F RF pipe is a pipe between the Type F RF card gate 245 and the Type F card application gate 253.

The T4TA pipe is a pipe between the T4T wired gate 242 and the Type A card application gate 251. The T4 TB pipe is a pipe between the T4T wired gate 242 and the Type B card application gate 252. The T3T pipe is a pipe between the T3T wired gate 244 and the Type F card application gate 253.

In addition, the UICC 113 can implement arbitrary applications, but in FIG. 14, as an example, an APDU application 261 that is an APDU command base application and a type F application 262 that is a T3T command base application are implemented.

Since both the T4T application 211 on the DH 111 and the APDU application 261 on the UICC 113 are applications that can process APDUs, it is possible to connect the foregoing with logical channels.

In addition, since both the T3T application 212 on the DH 111 and the Type F application 262 on the UICC 113 are applications that can process T3T commands, it is possible to connect the foregoing with logical channels.

1-9 Correspondence Management of HCI Management Information and E-HCI Management Information As in the table shown in FIG. 15, respectively different types information is managed in the HCI and the E-HCI. The CLF 112 that implements two interfaces, performs association of these types of information in the following manner. An example of connection ID and pipe ID is shown in FIG. 16. In addition, an example of NFCEE protocol and gate ID is shown in FIG. 17.

1-10 Connection Process from DH to UICC

The DH 111 performs a connection process to the UICC 113 in a case in which communication with the UICC 113 is necessary. In a case in which a logical channel is established from the DH 111 to the UICC 113, the DH 111 transmits a connection creation command (parameters: NFCEE ID and NFCEE Protocol) to the CLF 112.

In a case in which an E-HCI pipe that corresponds to the designated NFCEE Protocol has been formed, the CLF 112 creates a corresponding connection and replies using a connection creation command response (Status=OK). In a case in which a pipe has not been formed, the CLF 112 replies with an error. Since the E-HCI does not have a function for creating a pipe from the CLF 112 to the UICC 113, it is necessary for the UICC 113 (host) to create a pipe beforehand during an initialization period such as at the time of insertion of the UICC 113.

1-11 Establishment of Logical Channels Between T4T and APDU Applications

Figure 18:
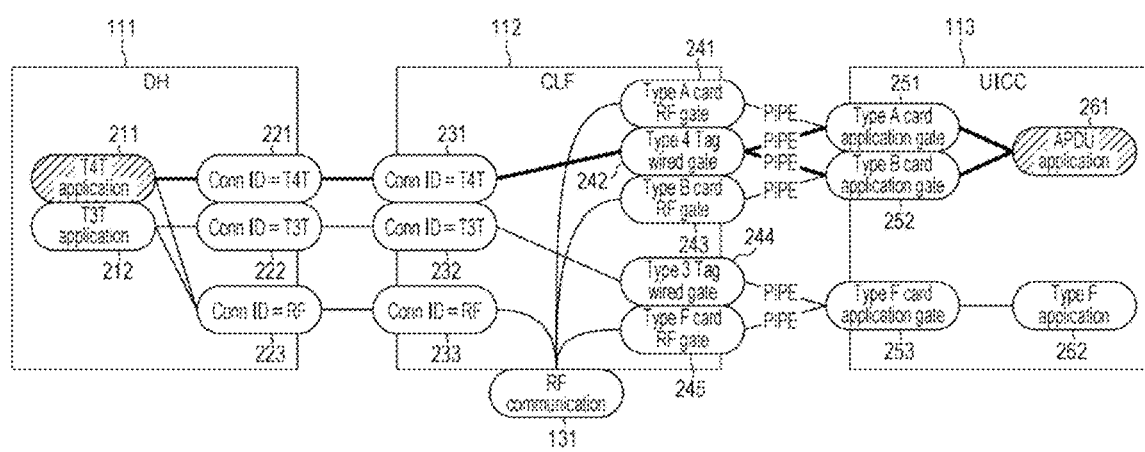
FIG. 18 is a diagram that shows an example of a connection in an NFC device.

As in the example shown in FIG. 18, in a case in which the T4T application 211 on the DH 111 establishes a logical channel with the APDU application 261 on the UICC 113, the DH 111 designates NFCEE ID=UICC and NFCEE Protocol=T4T in the connection creation command that is to be transmitted.

In such a case, the CLF 112 creates T4T connection IDs 221 and 231 since T4T is designated in the NFCEE Protocol, and if there is a pipe that is connected to the T4T wired gate 242 on the basis of NFCEE Protocol=T4T, a T4TA pipe ID and a T4 TB pipe ID are also linked. In a case in which a link has been formed a normal termination status connection creation command response is transmitted to the DH 111. In a case in which there is no pipe and it is not possible to form a link, a connection creation command response that includes an error status is transmitted to the DH 111.

Additionally, a protocol and gate ID correspondence table is retained in a fixed manner. In addition, at the time of a connection creation request, a gate ID that corresponds to the protocol is retrieved. A pipe ID and a connection ID that correspond to the gate ID are associated. In a case in which plural gate IDs that correspond to the protocol are found, the foregoing are associated with one connection ID.

An example of the flow of the connection process from the DH to the UICC will be explained with reference to the flowchart of FIG. 19.

If the UICC 113 is attached to a predetermined position of the NFC device 100, in Step S101, with respect to the UICC 113, the CLF 112 performs a pipe opening request to an Identity gate. In Step S102, with respect to the UICC 113, the CLF 112 performs a gate ID list acquisition request to the Identity gate. With respect to the request, the CLF 112 acquires and retains a gate ID list supplied from the UICC 113.

In Step S103, with respect to the CLF 112, the UICC 113 performs a pipe creation request to a DH connection gate. At this time, the UICC 113 supplies a Dest host ID, Dest gate ID, source host ID and a source gate ID.

In Step S104, the CLF 112 creates a pipe to the DH connection gate depending on the request. In addition, the CLF 112 allocates the supplied Dest gate ID to a pipe ID that corresponds to the gate ID of the DH connection gate and creates a table 401.

In Step S105, the CLF 112 refers to a protocol and gate ID correspondence table 404 that has been stored in advance, and determines whether or not there is a protocol that corresponds to the requested Dest gate ID. In a case in which it is determined that there is a protocol, the process proceeds to Step S106.

In Step S106, the CLF 112 updates a connection ID and pipe ID correspondence table (table information) 402 that has already been created (stored) and is related to the connection ID of the protocol. More specifically, the CLF 112 adds the requested Dest gate ID (the pipe ID that was set in Step S104) to a pipe ID column of the correspondence table 402 that corresponds to a protocol that corresponds to the requested Dest gate ID. The process proceeds to Step S108 once the update to the correspondence table 402 has been completed.

In addition, in Step S105, in a case in which it is determined that there is no protocol that corresponds to the requested Dest gate ID, the process proceeds to Step S107.

In Step S107, the CLF 112 creates and stores a connection ID and pipe ID correspondence table (table information) 402 that is related to the requested Dest gate ID. At this time, since a connection ID that is associated with the requested Dest gate ID is yet to be determined, the CLF 112 associates a "blank" (empty) connection ID with the pipe ID (Dest gate ID). The value that shows this "blank" (empty) is arbitrary. The process proceeds to Step S108 once the process of Step S107 has been completed.

In this manner, even if the correspondence relationship between the connection ID and pipe ID is yet to be determined, the CLF 112 creates the correspondence table 402 as soon as a pipe has been established. As a result of this, in a case in which there is a connection request from the DH 111, the CLF 112 can easily establish communication using this correspondence table 402.

In Step S108, the CLF determines whether or not to create another pipe. In a case in which it is determined that another pipe is to be created, the process returns to Step S103. In other words, the processes of Step S103 to Step S108 are repeated for the number of pipes that are to be created.

In Step S108, in a case in which it is determined that another pipe is not to be created, the process proceeds to Step S109.

If a connection creation request for UICC connection is acquired from the DH 111 in Step S109, in Step S110, the CLF 112 creates a connection for UICC connection of the protocol designated in the request. In addition, the CLF 112 allocates a connection ID to the created connection, and creates and stores a correspondence table 403 that associates the protocol and connection ID thereof.

In Step S111, the CLF 112 refers to a protocol and gate ID correspondence table 404 that has been stored in advance, and determines whether or not there is a gate that corresponds to the requested protocol. In a case in which it is determined that there is a gate, the process proceeds to Step S112.

In Step S112, the CLF 112 updates a connection ID and pipe ID correspondence table (table information) 402 that has already been created (stored) and is related to the gate. More specifically, the CLF 112 adds the connection ID allocated in Step S110 to a connection ID column of the correspondence table 402 that corresponds to the gate that corresponds to the requested protocol. In the case of the example of FIG. 19, the correspondence table 402 is updated and becomes a correspondence table 405. The CLF 112 stores this correspondence table 405. The connection process is completed once the update to the correspondence table 402 has been completed.

In addition, in Step S111, in a case in which it is determined that there is no gate that corresponds to the requested protocol, the process proceeds to Step S113.

In Step S113, the CLF 112 creates and stores a connection ID and pipe ID correspondence table (table information) 402 that is related to the requested protocol. At this time, since a pipe ID that is associated with the requested protocol is yet to be determined, the CLF 112 associates a "blank" (empty) pipe ID with the connection ID. The value that shows this "blank" (empty) is arbitrary. The connection process is completed once the process of Step S113 has been completed.

In this manner, even if the correspondence relationship between the connection ID and pipe ID is yet to be determined, the CLF 112 creates the correspondence table 402 as soon as a connection has been established. As a result of this, in a case in which there is a connection request from the UICC 113, the CLF 112 can easily establish communication using this correspondence table 402.

Additionally, provided the location is accessible by the CLF 112, it is possible to provide the storage region that stores the information of each type of the above-mentioned correspondence tables and the like in an arbitrary location. For example, the storage region may be provided inside the CLF 112 or may be provided outside the CLF 112.

1-12 Establishment of Logical Channels Between T3T and Type F Applications

Figure 20:
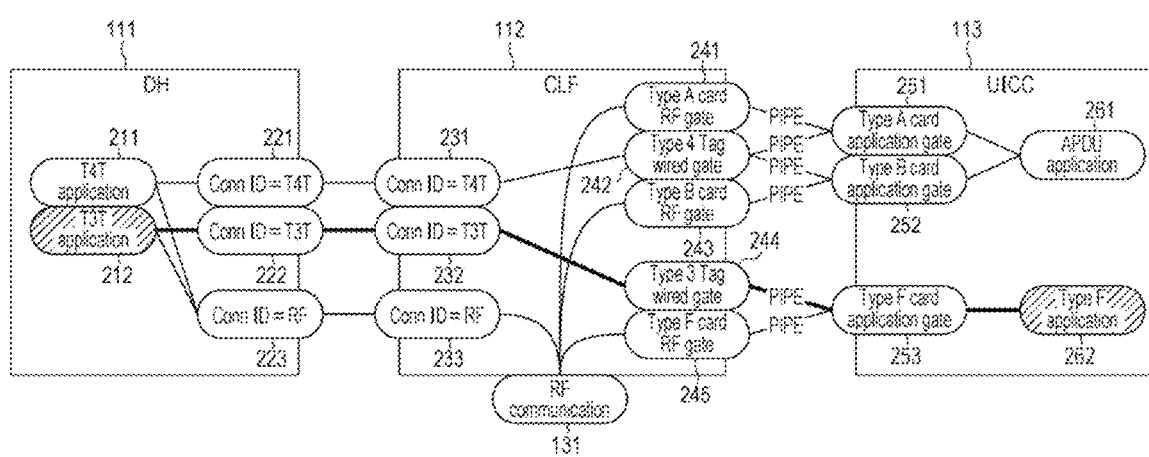
FIG. 20 is a diagram that shows an example of a connection in an NFC device.

As shown in FIG. 20, in a case in which the T3T application 212 on the DH 111 establishes a logical channel with the Type F application 262 on the UICC 113, the DH 111 designates NFCEE ID=UICC and NFCEE Protocol=T3T in the connection creation command is to be transmitted.

In such a case, the CLF 112 creates connections of T3T connection IDs 222 and 232 since T3T is designated in the NFCEE Protocol, and if there is a pipe that is connected to the T3T wired gate 244 on the basis of NFCEE Protocol=T3T, a T3T pipe ID is also linked. In a case in which a link has been formed a normal termination status connection creation command response is transmitted to the DH 111. In a case in which there is no pipe and it is not possible to form a link, the CLF 112 transmits a connection creation command response that includes an error status to the DH 111.

Figure 21:
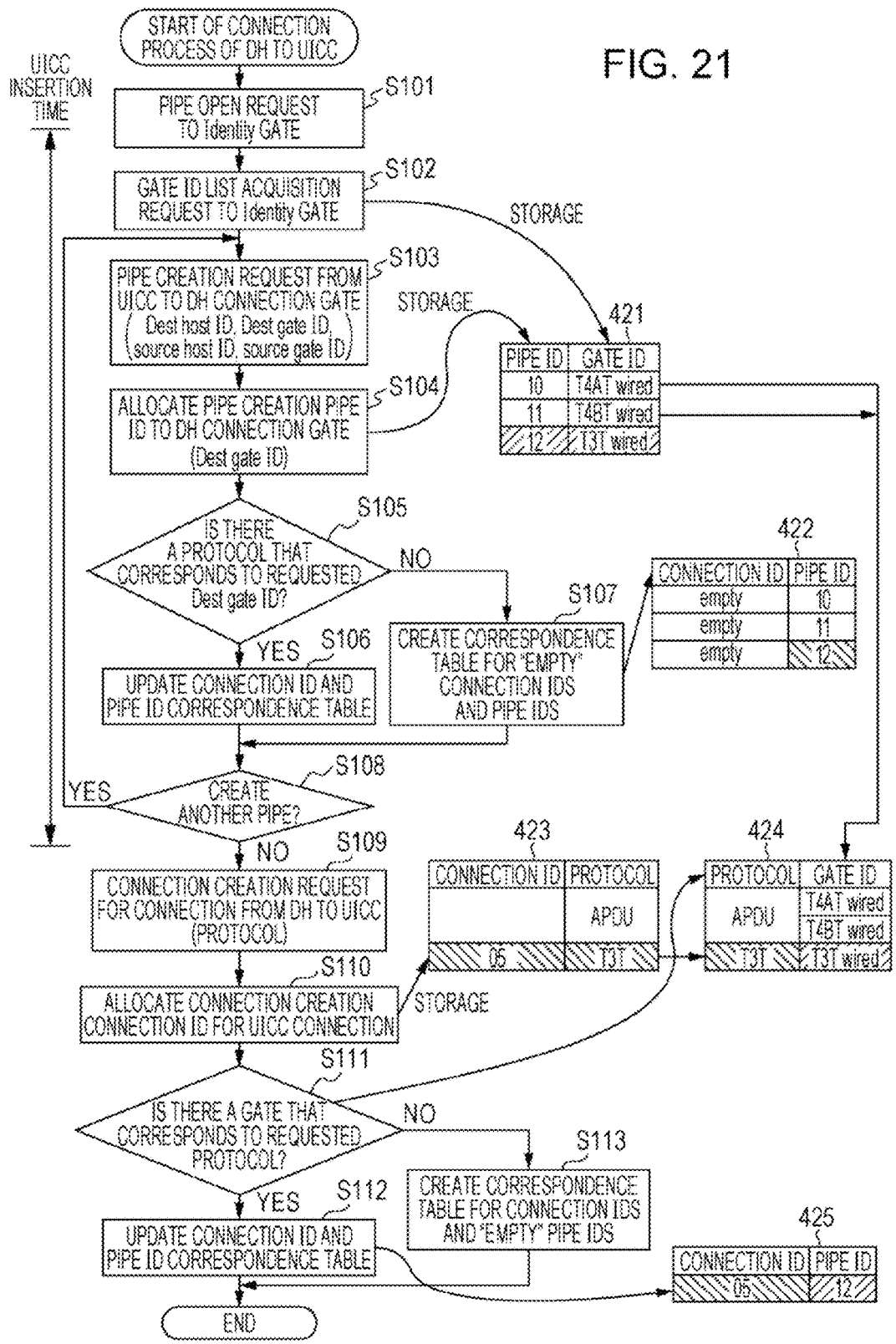
FIG. 21 is a flowchart that describes an example of the flow of a connection process from a DH to a UICC.

As shown in FIG. 21, the flow of the connection process from the DH to the UICC in this case is the same as the case that has been described with reference to FIG. 19.

In Step S104, the CLF 112 allocates pipe ID "12" to the T3T wired gate 244 and creates a table 421.

In Step S105, the CLF 112 refers to a protocol and gate ID correspondence table 424 that has been stored in advance, and determines whether or not there is a protocol that corresponds to the T3T wired gate 244.

In Step S106, the CLF 112 updates a connection ID and pipe ID correspondence table (table information) 422 that has already been created (stored) and is related to the connection ID of the protocol T3T.

In Step S107, the CLF 112 creates and stores a connection ID and pipe ID correspondence table (table information) 422 that is related to the T3T wired gate 244. More specifically, the CLF 112 for example, with respect to the pipe ID "12" allocated in the correspondence table 421, creates a correspondence table 422 that associates a "blank" (empty) connection ID with the pipe ID (Dest gate ID).

In this manner, even if the correspondence relationship between the connection ID and pipe ID is yet to be determined, the CLF 112 creates the correspondence table 422 as soon as a pipe has been established. As a result of this, in a case in which there is a connection request from the DH 111, the CLF 112 can easily establish communication using this correspondence table 422.

In Step S110, the CLF 112 creates a connection for UICC connection of the T3T, allocates a connection ID "05" to the created connection, and created and stores a correspondence table 423 that associates the T3T and connection ID thereof.

In Step S111, the CLF 112 refers to a protocol and gate ID correspondence table 424 that has been stored in advance, and determines whether or not there is a gate that corresponds to the protocol T3T.

In Step S112, the CLF 112 adds the connection ID "05" allocated in Step S110 to a connection ID column of the correspondence table 402 that has already been created (stored) that corresponds to the pipe ID "12" that corresponds to the requested protocol T3T.

In Step S113, the CLF 112 creates and stores a connection ID "05" and "blank" (empty) pipe ID correspondence table (table information) 422 that is related to the requested protocol T3T.

In this manner, even if the correspondence relationship between the connection ID and pipe ID is yet to be determined, the CLF 112 creates the correspondence table 422 as soon as a connection has been established. As a result of this, in a case in which there is a connection request from the UICC 113, the CLF 112 can easily establish communication using this correspondence table 422.

1-13 Packet Transmission Process from DH to UICC

An application on the DH 111 transmits UICC 113 corresponding application packets using connections created in the manner described above. In a case in which a T4T application 211 transmits a packet to the UICC 113, a T4T Connection ID is designated and the packet is transmitted.

The CLF 112 transmits a packet that has been received using a connection with a T4T Connection ID to a T4TA pipe ID and a T4 TB pipe ID, which are corresponding E-HCI pipes, of an E-HCI pipe (an existing pipe). At this time, the CLF 112 performs a process of replacing an HCI header with an E-HCI header.

1-14 Connection Process from UICC to DH

Next, a connection process from the UICC 113 to the DH 111 will be described. This process is a process that is performed at the time of insertion of the UICC 113 before the DH 111 creates a connection to the UICC 113.

In a case in which a logical channel is established from the UICC 113 to the DH 111, the UICC 113 transmits ADM_CREATE_PIPE to the CLF 112. In a case in which a designated gate is implemented, the CLF 112 responds with ANY_OK and the pipe ID of a created pipe.

After pipe creation, in order to open the pipe, the UICC 113 transmits ANY_OPEN_PIPE and the CLF responds ANY_OK. A logical channel to the DH 111 is established by the designated gate being implemented. Since Conn IDs are limited to 15, it is possible to use the resources thereof effectively by dynamically creating the foregoing.

In the same manner as the E-HCI, since the HCI does not have a function for creating a connection from the CLF 112 to the DH 111, for example, it is necessary for the DH 111 to create a connection beforehand during an initialization period at the time of start-up of the DH 111.

In a case of connecting from the UICC 113, since the UICC 113 acquires a gate list that is in the CLF 112, logical channel are established for all of the gates that are in the CLF 112.

1-15 Establishment of Logical Channels Between APDU and T4T Applications

In FIG. 18, in the opposite manner to that of the example described above, in a case in which the APDU application 261 on the UICC 113 establishes a logical channel with the T4T application 211 on the DH 111, the UICC 113 designates destination HID=DH, destination GID=T4T wired gate source GID=Type A and/or Type B card application gate in the ADM_CREATE_PIPE that is to be transmitted. Here the GID that is designated is designated as if there is a T4T wired gate 242 on a hypothetical DH.

In such a case, the CLF 112 creates a connection of a T4T connection ID, and links a T4T wired pipe ID (a T4TA wired pipe or a T4 TB wired pipe) on the basis of the destination GID.

An example of the flow of the connection process from the UICC to the DH will be explained with reference to the flowchart of FIG. 22.

The connection process in this case is a similar process to the process of each step of the connection process from the DH to the UICC described with reference to the flowchart of FIG. 19, but is performed with a different process order.

Figure 19:
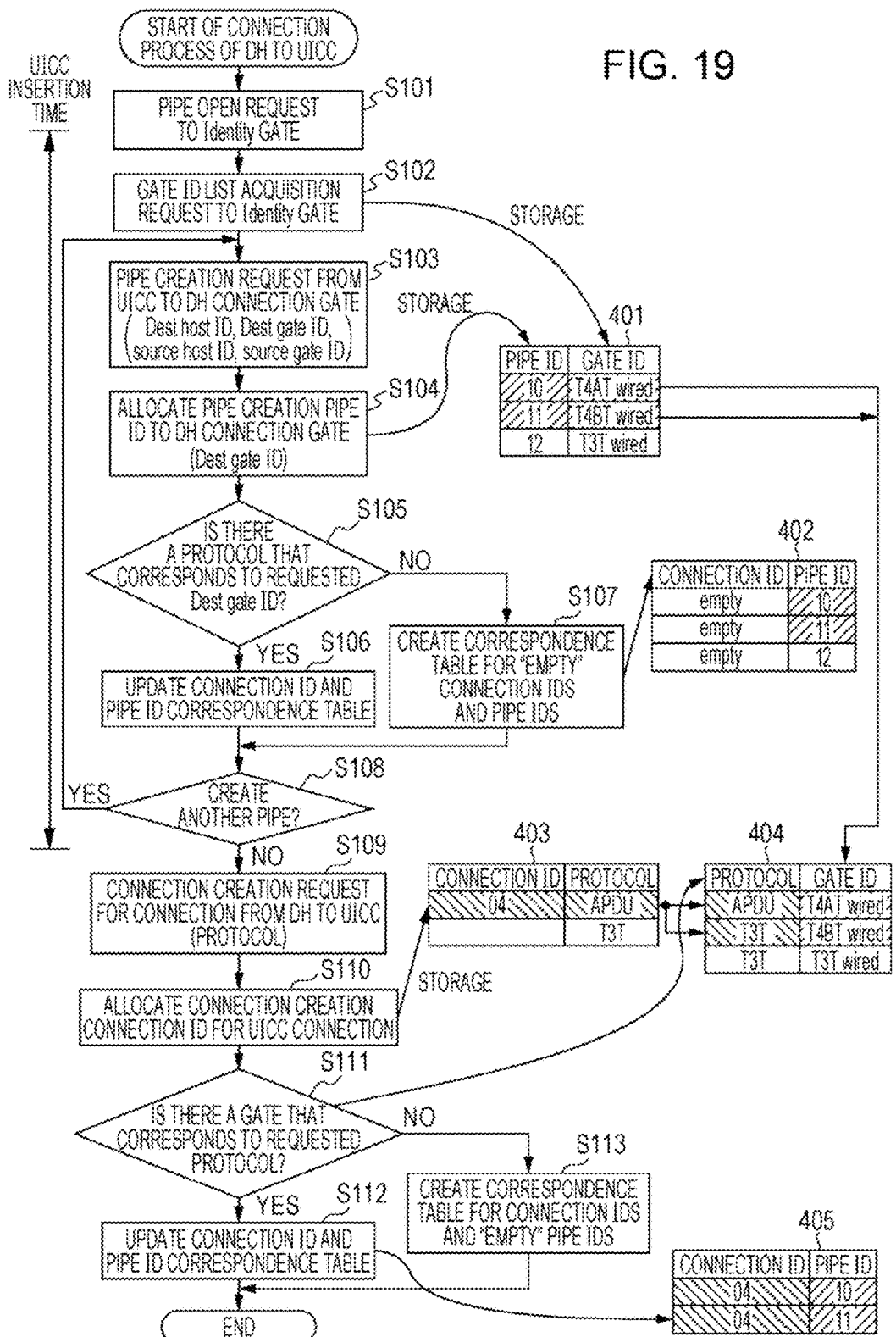
FIG. 19 is a flowchart that describes an example of the flow of a connection process from DH to UICC.

More specifically, in Step S201 to Step S205, similar processes to each process of Step S109 to Step S113 of FIG. 19 are performed, and thereafter, in Step S206 to Step S212, similar processes to each process of Step S101 to Step S106 of FIG. 19 are performed.

Figure 22:
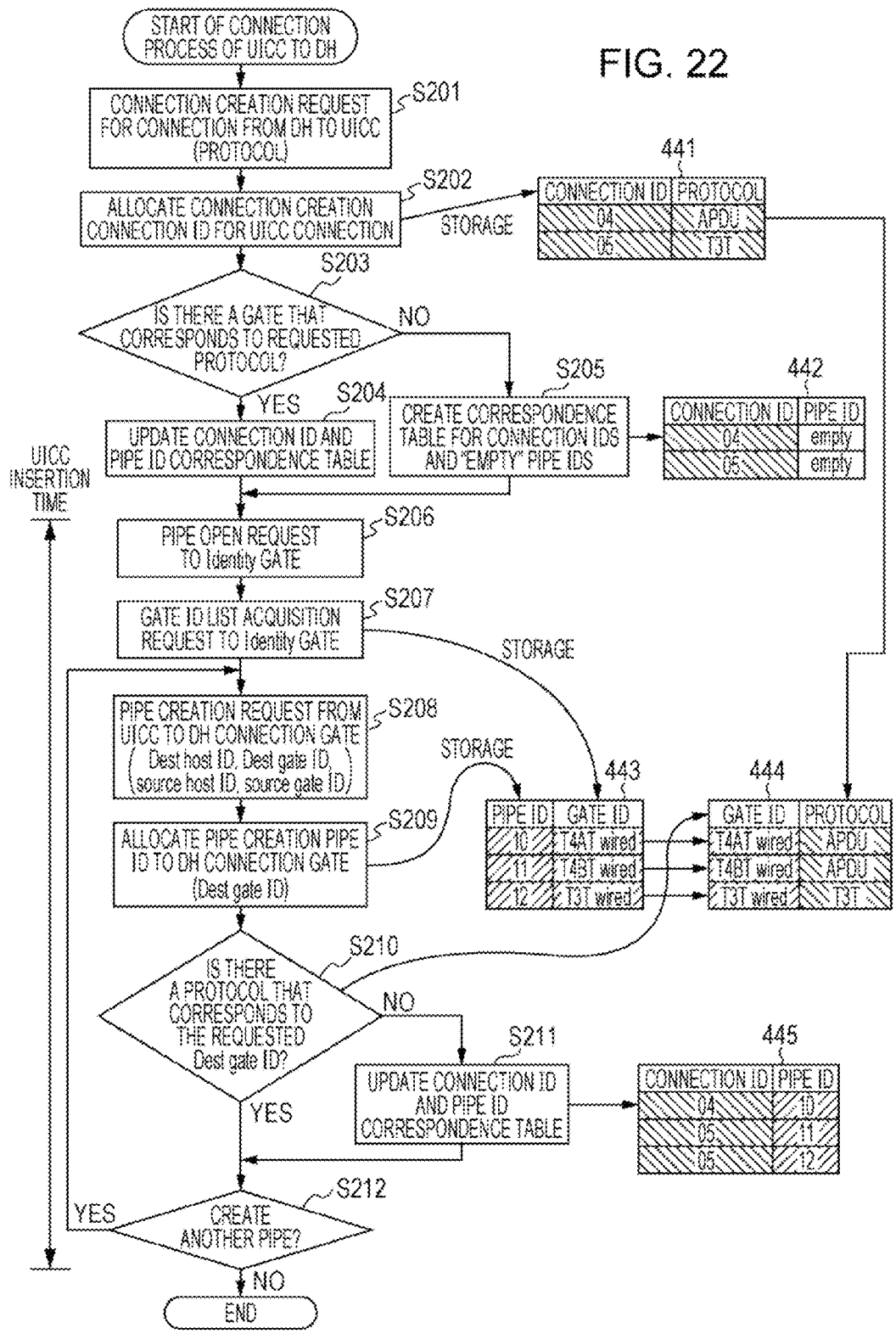
FIG. 22 is a flowchart that describes an example of the flow of a connection process from a UICC to a DH.

Additionally, in the case of the example of FIG. 22, in Step S210, in a case in which it is determined that there is no protocol that corresponds to the requested Dest gate ID, the process proceeds to Step S212 without a process similar to Step S107 being performed.

A more specific example of the flow of the above process will be described below. If a connection creation request for UICC connection is acquired from the DH 111 in Step S201, in Step S202, the CLF 112 creates a connection for UICC connection of the protocol "APDU" designated in the request. In addition, the CLF 112 allocates a connection ID "04" to the created connection, and creates and stores a correspondence table 441 that associates the protocol and connection ID thereof.

In addition, in a case in which there is a gate that corresponds to the requested protocol, in Step S204, the CLF 112 creates and stores a correspondence table (table information) 442 for the connection ID "04" that corresponds to the requested protocol and a pipe ID of the gate thereof.

Furthermore, in a case in which there is no gate that corresponds to the requested protocol, in Step S205, the CLF 112 creates and stores a correspondence table (table information) 442 for the connection ID "04" that corresponds to the requested protocol and a "blank" (empty) pipe ID.

In this manner, even if the correspondence relationship between the connection ID and pipe ID is yet to be determined, the CLF 112 creates the correspondence table 442 as soon as a connection has been established. As a result of this, in a case in which there is a connection request from the UICC 113, the CLF 112 can easily establish communication using this correspondence table 442.

In addition, in Step S207, with respect to the UICC 113, the CLF 112 performs a gate ID list acquisition request to the Identity gate. With respect to the request, the CLF 112 acquires and retains a gate ID list supplied from the UICC 113.

In Step S209, the CLF 112 creates a pipe to the DH connection gate depending on the request. In addition, the CLF 112 associates the supplied Dest gate ID as pipe IDs "10 and 11" and creates a table 443.

Furthermore, in Step S210, the CLF 112 refers to a protocol and gate ID correspondence table 444 that has been stored in advance, and determines whether or not there is a protocol that corresponds to the requested Dest gate ID. In a case in which it is determined that there is a protocol, the process proceeds to Step S211.

In Step S211, the CLF 112 updates a connection ID and pipe ID correspondence table (table information) 442 that has already been created (stored) and is related to the connection ID of the protocol. More specifically, the CLF 112 adds the requested Dest gate IDs "10 and 11" to a pipe ID column of the correspondence table 442 that corresponds to the connection ID "04". The process proceeds to Step S212 once the update to the correspondence table 442 has been completed.

1-16 Establishment of Logical Channels Between Type F and T3T Applications

In FIG. 20, contrary to the above-described example, in a case in which the Type F application 262 on the UICC 113 establishes a logical channel with the T3T application 212 on the DH 111, the UICC 113 designates destination HID=DH, destination GID=T3T wired gate, source GID=Type F card application gate in the ADM_CRE-ATE_PIPE that is to be transmitted. Here the GID that is designated is designated as if there is a T3T wired gate 244 on a hypothetical DH 111.

In such a case, the CLF 112 creates a connection of a T3T connection ID and links a T3T wired pipe ID on the basis of the destination GID.

Since the connection process in this case is performed in a similar manner to that described with reference to the flowchart of FIG. 22, the description thereof will be omitted.

1-17 Packet Transmission Process from UICC to DH

An application on the UICC 113 transmits DH 111 corresponding application packets using a completed E-HCI pipe. In a case in which an APDU application 261 transmits a packet to the DH 111, a created T4TA wired pipe or T4 TB wired pipe is designated and the packet is transmitted.

Either of the two routes may be used. For example, if another application is using the T4 TB wired pipe, it is possible to transmit a DH packet via the T4TA wired pipe in parallel. At this time, the CLF 112 performs a process of replacing an E-HCI header with an HCI header.

1-18 Removal Process of UICC

In a case in which the UICC 113 has been disengaged, a notification is sent from the CLF 112 to the DH 111. As a result of this, it is possible to update the correspondence of connection IDs to pipe IDs in a timely manner, and it is possible to prevent inconsistent processes such as performing data transmission to an entity that is not connected in a practical sense. The UICC 113 removal notification from the CLF 112 to the DH 111 is sent in the format shown by FIG. 8.

Figure 23:
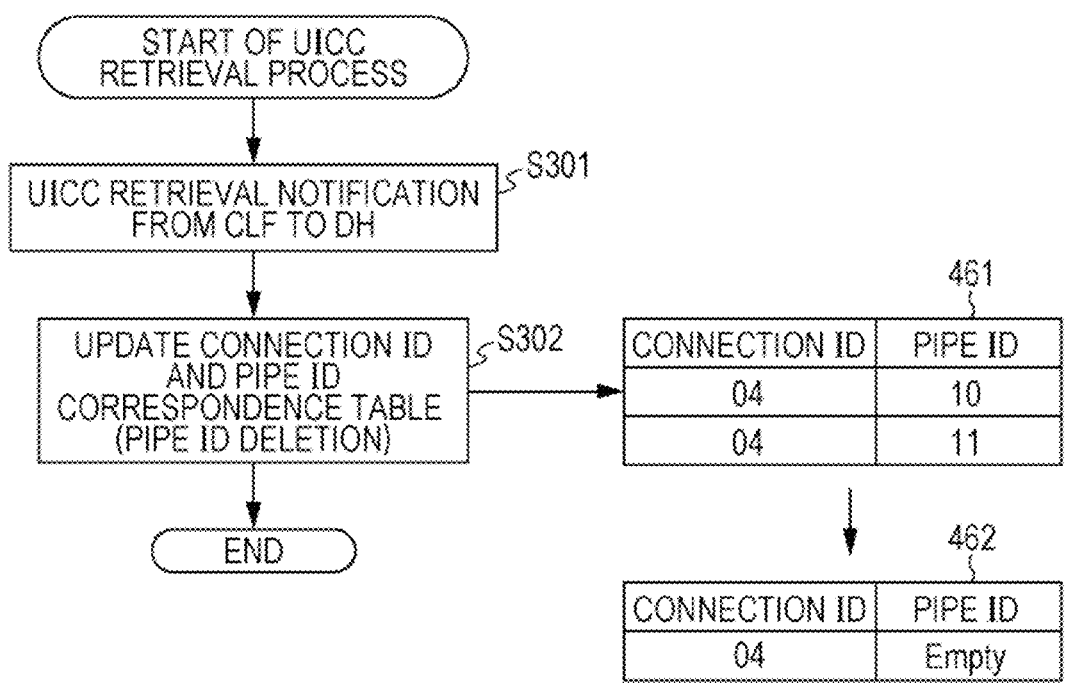
FIG. 23 is a flowchart that describes an example of the flow of a UICC removal process.

An example of the flow of the UICC removal process will be described with reference to the flowchart of FIG. 23. In Step S301, the CLF 112 sends a notification of the fact that the UICC 113 has been disengaged to the DH 111.

In Step S302, the CLF 112 deletes pipe ID information that corresponds to the disengaged UICC 113 from the connection ID and pipe ID correspondence table (table information). For example, the correspondence table 461 is retained. If the pipe IDs "10" and "11" are deleted as a result of the UICC 113 being disengaged, as shown in the correspondence table 462, the CLF 112 sets a value that shows a "blank" (empty) in place of the above-mentioned pipe IDs. The UICC removal process is completed once the process of Step S302 has been completed.

Through such a configuration, a connection ID correspondence table for which there is no longer a corresponding pipe is preserved. As a result of this, in a case in which the UICC 113 is set again, the CLF 112 can easily establish communication using this correspondence table 462.

1-19 Connection Termination Request from DH

It is possible to disconnect a communication channel that is connected to the UICC 113 by transmitting a connection termination command from the DH 111. In such a case, the CLF 112 updates the correspondence of connection IDs and pipe IDs.

Figure 24:
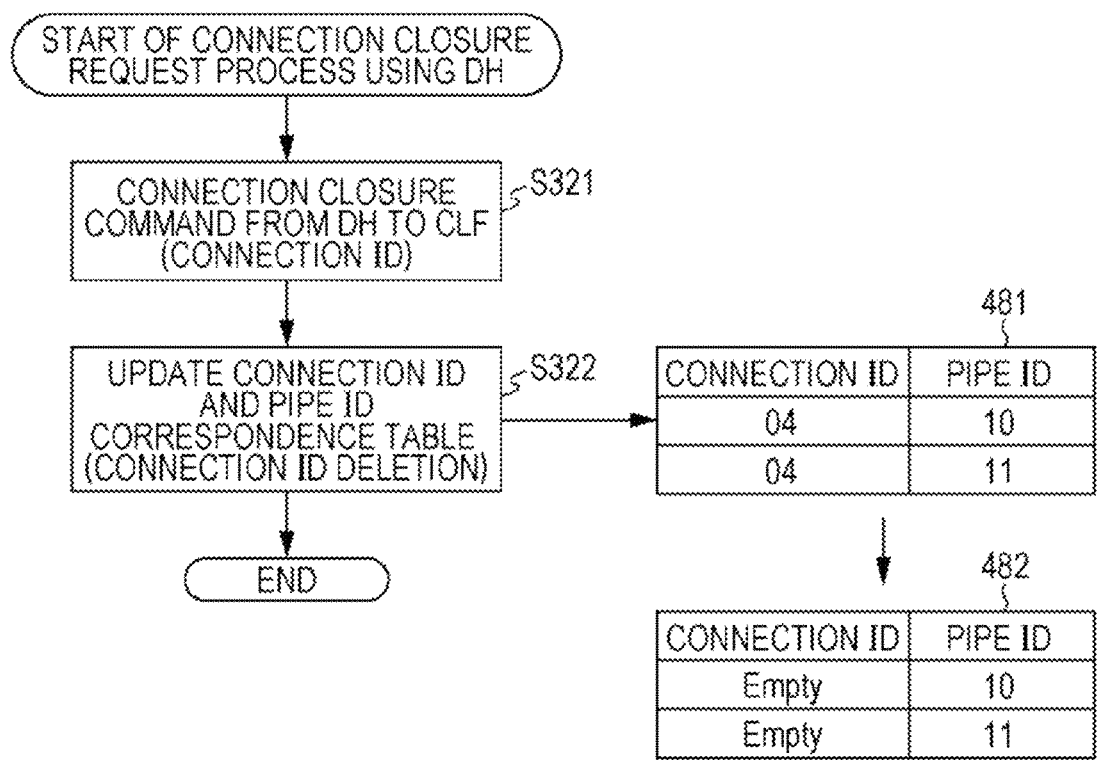
FIG. 24 is a flowchart that describes an example of the flow of a connection termination request process by a DH.

An example of the flow of a connection termination request process by the DH will be described with reference to the flowchart of FIG. 24. In Step S321, the CLF 112 acquires a connection termination command supplied from the DH 111. A connection to be terminated is specified in the connection termination command using the connection ID.

In Step S322, the CLF 112 updates a connection ID and pipe ID correspondence table (table information) on the basis of the request. That is, the information of the designated connection ID is deleted from the correspondence table. For example, the correspondence table 481 is retained. If connection termination of connection ID "04" is requested, as shown in correspondence table 482, the CLF 112 sets a value that shows a "blank" (empty) in place of the connection ID "04". The process of the connection termination request by the DH is completed once the process of Step S322 has been completed.

Through such a configuration, a pipe ID correspondence table for which there is no longer a corresponding pipe is preserved. As a result of this, in a case in which communication with the UICC 113 from the DH 111 is requested again, the CLF 112 can easily establish communication using this correspondence table 482.

1-20 Storage of Pipe Status

In compliance with ETSI, it is necessary for the CLF 112 to store pipe status in a non-volatile manner. When the UICC 113 is inserted, the CLF 112 performs activation of an SWP interface with the UICC 113, retains a 2-byte SYNC ID that is transmitted from the UICC 113 during this time. Furthermore, in a case in which pipe creation or opening is performed, in association with the SYNC ID, the CLF 112 retains the ID and status of the pipe that has been created or opened.

In a case in which at least one retained SYNC ID coincides with the SYNC ID transmitted from the UICC, the CLF 112 determines that it is a UICC that has been inserted before and returns the retained pipe status to the original state. As a result of this, it is possible to shorten the procedures of pipe creation and opening.

1-21 Implementation Example of Correspondence Table

The CLF 112 secures fixed memory in order to store pipe ID and connection ID correspondence tables. For example, as shown in FIG. 25, the CLF 112 secures entries for 16 pipe IDs and sets all of the values thereof to "FF".

In a case in which pipe creation is requested by the UICC 113, when a connection that has a protocol that corresponds to the designated gate ID is found, the CLF 112 writes a pipe ID and a connection ID that is associated with therewith to a corresponding entry.

When a connection that has a protocol that corresponds to the designated gate ID is not found, the CLF 112 writes a pipe ID and a connection ID that is associated therewith to an entry for which both the pipe ID and the connection ID are "FF".

In a case in which connection creation is requested by the DH 111, when a pipe that has a gate ID that corresponds to the designated protocol is found, the CLF 112 writes a connection ID and a pipe ID that is associated with therewith to a corresponding entry.

When a pipe that has agate ID that corresponds to the designated protocol is not found, the CLF 112 writes a connection ID and a pipe ID that is associated therewith to an entry for which both the pipe ID and the connection ID are "FF".

In a case in which pipe deletion is requested, if the same value as the requested pipe ID is found, the CLF 112 sets the foregoing to "FF". In a case in which connection deletion is requested, if the same value as the requested connection ID is found, the CLF 112 sets the foregoing to "FF".

Second Embodiment

Computer

The series of processes described above can also be implemented using hardware, and can be implemented using software. In a case in which the series of processes is implemented using software, a program that constitutes the software can be installed on a computer. Here, a computer that is fitted with dedicated hardware, a computer which is capable of executing various functions through installing various programs thereon, such as a general personal computer or the like, are included in the term computer.

FIG. 26 is a block diagram that shows an example of a configuration of the hardware of a computer that executes the above-mentioned series of processes using a program.

In the computer 900 shown in FIG. 26, a CPU (Central Processing Unit) 901, a ROM (Read Only Memory) 902 and a RAM (Random Access Memory) 903 are mutually connected through a bus 904.

In addition, an input-output interface 910 is also connected to the bus 904. An input unit 911, an output unit 912, a storage unit 913, a communication unit 914 and a drive 915 are connected to the input-output interface 910.

The input unit 911 is formed of, for example, a keyboard, a mouse, a microphone, a touch panel, an input terminal or the like. The output unit 912 is formed of, for example, a display, a speaker, an output terminal or the like. The storage unit 913 is formed of, for example, a hard disk, a RAM disk, non-volatile memory or the like. The communication unit 914 is formed of, for example, a network interface. The drive 915 drives removable media 921 such as a magnetic disk, an optical disc, a magneto-optical disc, or a semiconductor memory.

In a computer that is configured in the above-mentioned manner, the above-mentioned series of processes is performed by the CPU 901, for example, loading a program stored in the storage unit 913 in the RAM 903 through the input-output interface 910 and the bus 904 and executing the program. In addition, the CPU 901 stores data and the like necessary in the execution of various processes as appropriate in the RAM 903.

It is possible to, for example, record the program that the computer (CPU 901) executes on the removable media 921 as package media or the like and apply the program in this manner. In addition, it is possible to provide the program through a wired or wireless transmission medium such as a local area network, the Internet or a digital satellite broadcast.

In a computer, it is possible to install the program on the storage unit 913 through the input-output interface 910 by mounting the removable media 921 to the drive 915. In addition, it is possible to receive the program with the communication unit 914 through a wired or wireless transmission medium and install the program on the storage unit 913. It is also possible to install the program on the ROM 902 or the storage unit 913 in advance.

Additionally, the program that the computer executes may be a program which performs the processes in time series order according to the order described in the present specification or may be program which performs the processes in parallel or at a necessary point in time such as when evoked.

In addition, in the present specification, the steps that describe the program that is stored on a recording medium include processes that are performed in time series order according to the described order as a matter of course, and also process which are not necessarily performed in time series order and are executed in parallel or individually.

In addition, in the present specification, system refers to a plurality of components (apparatuses, modules (parts) assemblies etc.) regardless of whether or not all of the components are contained in the same housing. Therefore, both a plurality of apparatuses that are accommodated in separate housings and connected through a network and a single apparatus in which a plurality of modules are accommodated in a single housing form a system.

In addition, a configuration described above as a single apparatus (or processing unit) may be divided and configured as a plurality of apparatuses. Conversely, a configuration described above as a plurality of apparatuses (or processing units) may be combined and configured as a single apparatus (or processing unit). In addition, configurations other than those described above may be added to the configuration of each apparatus (or each processing unit). Furthermore, provided the effective configuration and action of the system as a whole is the same, a portion of the configuration of a certain apparatus (or processing unit) may be included in the configuration of another apparatus (or processing unit).

Favorable embodiments of the present disclosure have been described above with reference to the appended drawings, but the technical scope of the present disclosure is not limited to the examples given. It is clear that a person of ordinary skill in the technical field of the present disclosure could conceive of various modified examples and amended examples in the scope of the technical idea set forth in the claims, and naturally, it is understood that such examples are also within the technical scope of the present disclosure.

For example, it is possible for the present disclosure to have a cloud computing configuration in which a single function is shared through a network between a plurality of apparatuses which perform the processes by cooperating.

Further, in addition to each Step described in the above-mentioned flowchart being executed by a single apparatus, it is possible for the foregoing to be shared and executed by a plurality of apparatuses.

Furthermore, in a case in which a plurality of processes are included in a single step, in addition to the plurality of processes that are included in the single step being executed by a single apparatus, it is possible for the foregoing to be shared and executed by a plurality of apparatuses.

Additionally, it is possible for the present disclosure to take the have the following configurations.

(1) An information processing apparatus including a plurality of processing units and a connection control unit that controls the connections between the plurality of processing units, in which the connection control unit is provided with a table creation unit which, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, a table storage unit that stores the table information created by the table creation unit, and a table update unit that updates the table information for the second logical channel that is stored in the table storage unit so as to configure the first logical channel as a logical channel that corresponds to the second logical channel in a case in which there is a second logical channel.

(2) The information processing apparatus of (1), in which the connection control unit is further provided with a logical channel establishment unit that establishes the logical channels between the processing units, the table creation unit creates the table information for the first logical channel without designating a logical channel that corresponds to the first logical channel when there is no second logical channel in a case in which the first logical channel has been established by the logical channel establishment unit, and the table update unit updates the table information for the second logical channel that is stored in the table storage unit so as to configure the first logical channel as a logical channel that corresponds to the second logical channel when there is a second logical channel in a case in which the first logical channel has been established by the logical channel establishment unit.

(3) The information processing apparatus of (2), in which the table creation unit and the table update unit respectively determine whether or not there is a second logical channel that corresponds to the first logical channel on the basis of a correspondence table of the characteristics of each logical channel.

(4) The information processing apparatus of (3), in which the plurality of processing units include a first processing unit in which the logical channel establishment unit establishes logical channels for each function, and a second processing unit in which the logical channel establishment unit establishes logical channels for each protocol, the correspondence table includes information that shows a correspondence relationship of the functions and the protocols as the characteristics, the table creation unit creates the table information for the first logical channel without designating a logical channel that corresponds to the first logical channel when, on the basis of the correspondence table, there is no second logical channel for the protocol that corresponds to the function of the first logical channel, which is established with the second processing unit, in a case in which a first logical channel has been established with the first processing unit by the logical channel establishment unit, and the table update unit updates the table information for the second logical channel that is stored in the table storage unit so as to configure the first logical channel as a logical channel that corresponds to the second logical channel when, on the basis of the correspondence table, there is a second logical channel for the protocol that corresponds to the function of the first logical channel, which is established with the second processing unit, in a case in which a first logical channel has been established with the first processing unit by the logical channel establishment unit.

(5) The information processing apparatus of (2) to (4), in which the logical channel establishment unit establishes logical channels with communication standards that differ from one another with each processing unit.

(6) The information processing apparatus of (2) to (5), in which the logical channel establishment unit establishes logical channels with a requested processing unit on the basis of requests from each processing unit.

(7) The information processing apparatus of (2) to (6), in which the logical channel establishment unit allocates identification information to the established logical channels.

(8) The information processing apparatus of (2) to (7), in which the connection control unit further includes a status storage unit that stores information that shows the current status of logical channels established by the logical channel establishment unit.

(9) The information processing apparatus of (1) to (8), in which the table information is information that shows a correspondence relationship between the logical channels using logical channel identification information.

(10) The information processing apparatus of (1) to (9), in which the table update unit deletes the information of a disconnected logical channel from the table information stored in the table storage unit in a case in which a logical channel is disconnected.

(11) The information processing apparatus of (1) to (10), in which the table storage unit secures a storage region that stores the table information in advance.

(12) The information processing apparatus of (1) to (11), in which the plurality of processing units includes a control unit that controls each unit of the information processing apparatus, and a device that is detachable from the information processing apparatus.

(13) The information processing apparatus of (1) to (12), in which the connection control unit further includes a wireless communication unit that performs wireless communication with other apparatuses.

(14) An information processing method for an information processing apparatus, in which the information processing apparatus, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, stores the created table information, and updates the stored table information for the second logical channel so as to configure the first logical channel as a logical channel that corresponds to the second logical channel in a case in which there is a second logical channel.

(15) A program which causes a computer to function as a table creation unit which, with respect to a first logical channel established with a processing unit, creates table information which shows a correspondence relationship between logical channels without designating a logical channel that corresponds to the first logical channel in a case in which there is no second logical channel established with another processing unit that corresponds to the first logical channel, a table storage unit that stores the table information created by the table creation unit, and a table update unit that updates table information for the second logical channel that is stored in the table storage unit so as to configure the first logical channel as a logical channel that corresponds to the second logical channel in a case in which there is a second logical channel.

The present disclosure contains subject matter related to that disclosed in Japanese Priority Patent Application JP 2012-135708 filed in the Japan Patent Office on Jun. 15, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 NFC device, 111 DH, 112 CLF 113 UICC, 121 HCI, 122 E-HCI, 131 antenna

The invention claimed is:

1. An information processing apparatus comprising:
  a plurality of processing units;
  a central processing unit that executes programming instructions stored in a memory to perform a process that:
    controls connections between the plurality of processing units, with respect to a first logical channel established with a processing unit of the plurality of processing units, and creates information which shows a correspondence relationship between logical channels without designating a logical channel that corresponds to the first logical channel in a case in which there is no second logical channel established with another processing unit of the plurality of processing units that corresponds to the first logical channel;
    stores the information in a storage unit;
    updates the information for the second logical channel that is stored so as to configure the first logical channel as a logical channel that corresponds to the second logical channel in a case in which there is a second logical channel; and
    determines whether or not the information is in the storage unit and updates the information if a determination is made that the information is in the storage unit.

2. The information processing apparatus according to claim 1, wherein the central processing unit further executes programming instructions that:
  establishes the logical channels between the plurality of processing units,
  creates the information for the first logical channel without designating a logical channel that corresponds to the first logical channel when there is no second logical channel in a case in which the first logical channel has been established, and
  updates the information for the second logical channel that is stored in the storage unit so as to configure the first logical channel as a logical channel that corresponds to the second logical channel when there is a second logical channel in a case in which the first logical channel has been established.

3. The information processing apparatus according to claim 2, wherein the central processing unit executes programming instructions that determines whether or not there is a second logical channel that corresponds to the first logical channel on the basis of a correspondence information of characteristics of each logical channel.

4. The information processing apparatus according to claim 3,
wherein the plurality of processing units includes: a first processing unit in which logical channels are established for each function, and a second processing unit in which logical channels are established for each protocol,
wherein the correspondence information includes information that shows a correspondence relationship of the functions and the protocols as the characteristics,
wherein the first logical channel is created without designating a logical channel that corresponds to the first logical channel when, on the basis of the correspondence the information, there is no second logical channel for the protocol that corresponds to the function of the first logical channel, which is established with the second processing unit, in a case in which a first logical channel has been established with the first processing unit, and
wherein the information for the second logical channel that is stored in the storage unit is updated so as to configure the first logical channel as a logical channel that corresponds to the second logical channel when, on the basis of the correspondence the information, there is a second logical channel for the protocol that corresponds to the function of the first logical channel, which is established with the second processing unit, in a case in which a first logical channel has been established with the first processing unit.

5. The information processing apparatus according to claim 2, wherein the logical channel establishment unit establishes logical channels with communication standards that differ from one another with each processing unit.

6. The information processing apparatus according to claim 2, wherein the central processing unit executes programming instructions that establishes logical channels with a requested processing unit on the basis of requests from each processing unit.

7. The information processing apparatus according to claim 2, wherein the central processing unit executes programming instructions that allocates identification information to the established logical channels.

8. The information processing apparatus according to claim 2, wherein the central processing unit executes programming instructions that stores information in a status storage unit that shows the current status of logical channels.

9. The information processing apparatus according to claim 1, wherein the information is information that shows a correspondence relationship between the logical channels using logical channel identification information.

10. The information processing apparatus according to claim 1, wherein the central processing unit executes programming instructions that deletes the information of a disconnected logical channel from the information stored in the storage unit in a case in which a logical channel is disconnected.

11. The information processing apparatus according to claim 1, wherein the central processing unit executes programming instructions that secures a storage region within the storage unit that stores the information in advance.

12. The information processing apparatus according to claim 1, wherein the plurality of processing units includes a device that is detachable from the information processing apparatus.

13. The information processing apparatus according to claim 1, further comprising a wireless communication unit that performs wireless communication with other apparatuses.

14. An information processing method for an information processing apparatus, wherein the information processing apparatus, with respect to a first logical channel established with a processing unit, creates information which shows a correspondence relationship between logical channels without designating a logical channel that corresponds to the first logical channel in a case in which there is no second logical channel established with another processing unit that corresponds to the first logical channel, stores the created information, and updates the stored information for the second logical channel so as to configure the first logical channel as a logical channel that corresponds to the second logical channel in a case in which there is a second logical channel, determines whether or not the information is in the storage unit and updates the information if a determination is made that the information is in the storage unit.

15. A non-transitory computer readable storage medium having stored thereon a program which causes a computer to function as:
a creation unit which, with respect to a first logical channel established with a processing unit, creates information which shows a correspondence relationship between logical channels without designating a logical channel that corresponds to the first logical channel in a case in which there is no second logical channel established with another processing unit that corresponds to the first logical channel;
a storage unit that stores the information created by the creation unit; and
an update unit that updates the information for the second logical channel that is stored in the storage unit so as to configure the first logical channel as a logical channel that corresponds to the second logical channel in a case in which there is a second logical channel, and
a connection control unit that determines whether or not the information is in the storage unit and updates the information if a determination is made that the information is in the storage unit.

* * * * *